Figure 1:
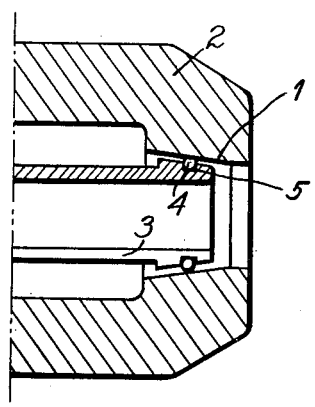

Dec. 25, 1962

A. HOLMBERG 3,070,380

CLAMPING DEVICE

Filed Nov. 16, 1959

3 Sheets-Sheet 1

INVENTOR.
Arne Holmberg

Dec. 25, 1962

A. HOLMBERG 3,070,380

CLAMPING DEVICE

Filed Nov. 16, 1959

3 Sheets-Sheet 2

INVENTOR.
Arne Holmberg

Dec. 25, 1962   A. HOLMBERG   3,070,380
CLAMPING DEVICE

Filed Nov. 16, 1959   3 Sheets-Sheet 3

INVENTOR.
Arne Holmberg

United States Patent Office 3,070,380
Patented Dec. 25, 1962

3,070,380
CLAMPING DEVICE
Arne Holmberg, Saltsjo-Bo, Sweden
(% Patent-Teknik Fack, Sollentuna 5, Sweden)
Filed Nov. 16, 1959, Ser. No. 853,363
19 Claims. (Cl. 279—51)

This invention relates to a clamping device, which can be used for a plurality of various purposes. By way of example, it may be used for clamping an object relative to another object, or in a special embodiment for clamping two objects against each other by aid of a member throughpassing at least one of the objects, on which member a clamping device according to the invention has been provided.

The main feature of the clamping device according to the invention is a collet, which is slotted or consists of several separate parts and is adapted to be pressed into a conical seat in a sleeve by an axially directed force, thereby pressing against a part inserted in the collet so as to clamp this relative to the sleeve, a number of balls being provided between the conical seat and the portion of the collet received in this seat, which balls are preferably evenly spaced from each other around the said portion of the collet and may also lie in a circular guide groove provided in the collet or in the sleeve.

The collet can be adapted to be unturnable relative to the sleeve, to which end the collet can be provided with an external pin or the like entering and sliding in an axial groove in the inside of the sleeve.

In a special embodiment of the clamping device the sleeve has external grooves, each of which extends at acute angles to the axis of the sleeve. Each groove engages with a pin extending radially inwards from a body enclosing the sleeve, so that the latter is displaced axially relative to the body when this is turned relative to the sleeve. In this case the grooves are preferably formed as so-called bayonet grooves.

In some cases a better functioning of the clamping device is obtained by giving the body the shape of a tube provided with bottom, and by inserting a compression spring between the body bottom and the end of the collet remote from the conical seat of the sleeve. It may also be to advantage to provide the body bottom with a hole somewhat larger than the hole in the collet. The body may also have an exterior so shaped, by way of example into a star knob, that the body can be turned by hand.

In a further embodiment of the invention two slotted or multiple part collets are adapted to be pressed towards each other into a sleeve, which is provided with two seats expanding conically towards the sleeve ends. In a modification of this embodiment the collects are adapted to be pressed in opposite directions out of a sleeve which has two seats contracting conically towards the sleeve ends.

In a further embodiment the sleeve may be arranged to float on the balls so as to be guided only through its engagement with the latter, thus being unguided in the axial direction.

According to the invention the balls provided between the conical seat or seats and the collet or collets may also be arranged in two or more circular rows. These ball rows may be placed each in its circular groove in collet or sleeve, and the grooves may have a semi-circular bottom.

In a special embodiment the collet may be arranged in a rigid support and urged in the direction toward the conical seat by a compression spring provided between a flange on the collet and the support, the sleeve provided with the conical seat being adapted to be pressed towards the collet by a screw means such as a screw, which displaces the sleeve axially when screwed in a second support rigidly connected with the first mentioned support.

In an embodiment comprising two collets which can be pressed towards each other, one of the collets may be placed in a rigid support and urged toward one conical seat by a compression spring fitted between a flange on the collet and the support, the sleeve provided with the two conical seats being adapted to be pressed toward the said collet placed in the support by insertion of the second collet in the second conical seat of the sleeve, the second collet being displaceable towards the first collet by means of a screw means. The screw means may consist of a screw, which is axially immovable relative to the second collet and screwable in a second support rigidly connected with said first support.

A device according to this invention has a great number of applications, of which here will be given one example only. Thus, it is easy to make a quick-clamp by means of the device. In this case the collet or collets are arranged so as to clamp around a cylindrical rod placed therein, which has an attachment for a jaw that constitutes the displaceable part of the clamp, while the stationary jaw is rigidly connected with the support or supports.

In a further embodiment of the invention each ball in one and the same ball row may be located both in a groove in the conical seat and in a groove provided in the external side of the compressible portion of the collet, and one of these grooves may be arranged at right angles to the axis of the device, while the other groove may lie in a plane through this axis. Each groove may have semi-circular bottom.

For greater clarity, reference is made to the accompanying drawings, in which

Figure 2:
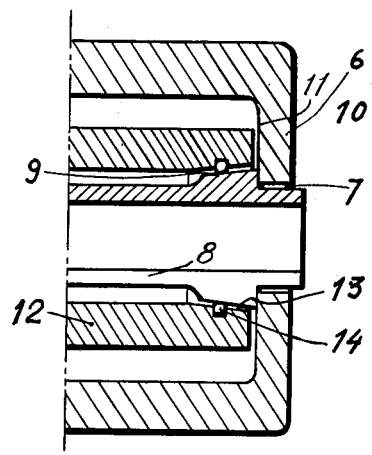
Figure 3:
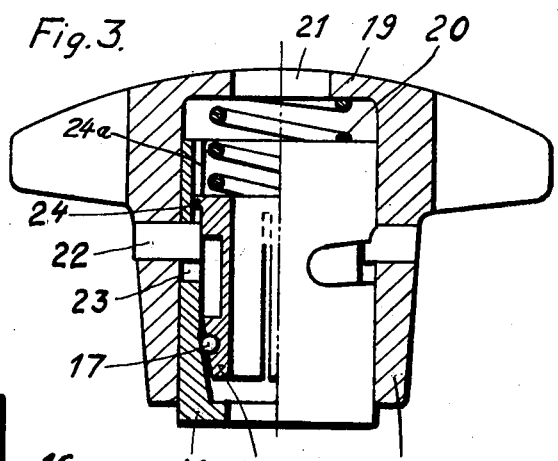
Figure 4:
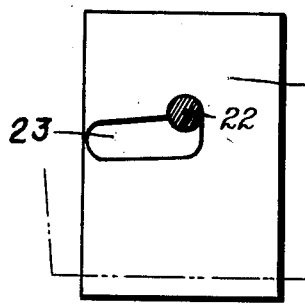
Figure 5:
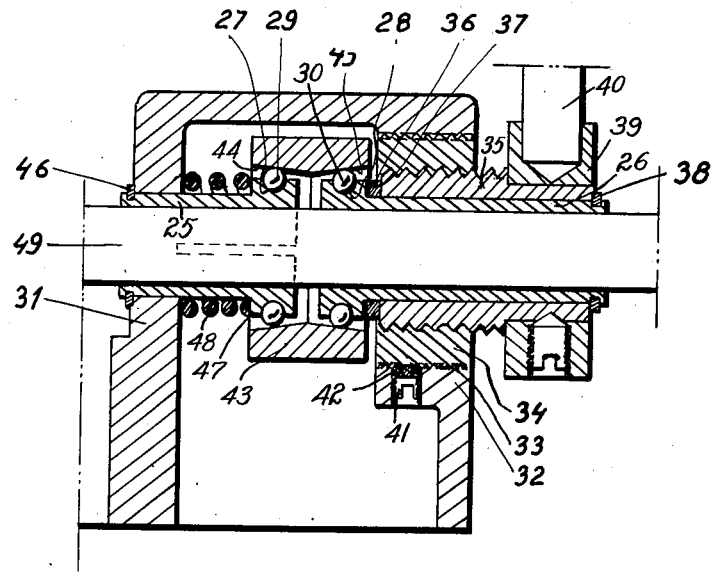
Figure 6:
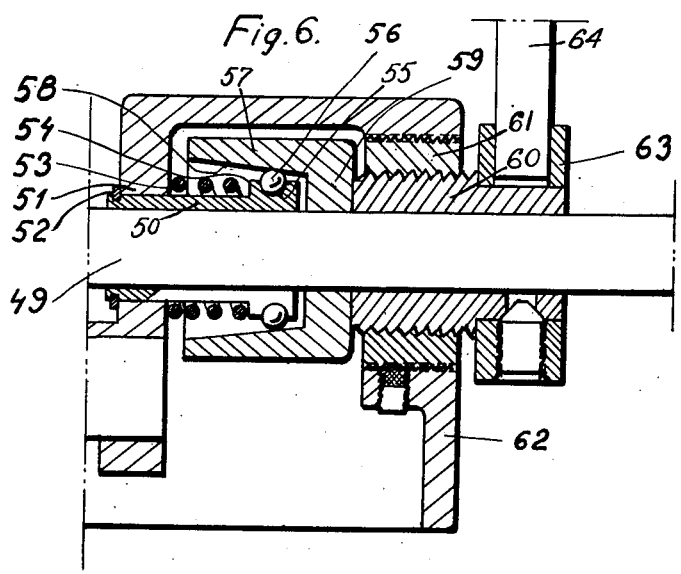
Figure 7:
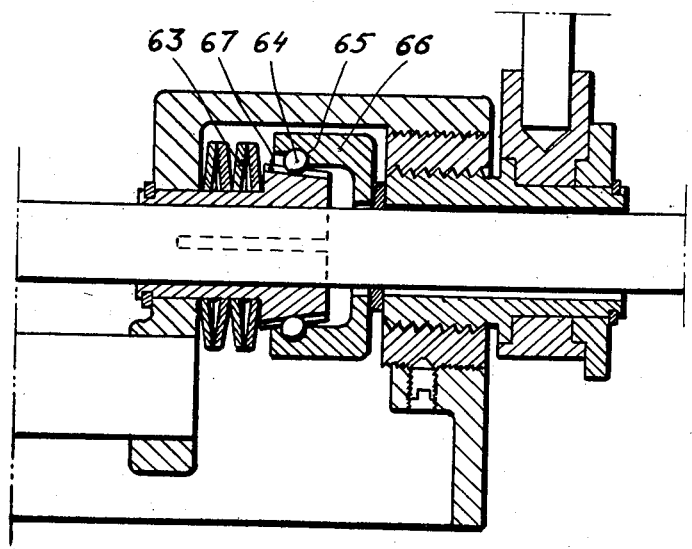

FIG. 1 is a section through a spindle nose for a turret lathe,

FIG. 2 is a section through a spindle nose for a turret lathe, slightly modified, FIG. 3 is a longitudinal section through a clamping device, which is particularly intended for use as a quick-acting lock knob, FIG. 4 is the sleeve shown in FIG. 3 as viewed from one of the groove sides, FIGS. 5–7 show embodiments of the invention specially designed for use as quick-clamps, FIG. 5 being a section of a device with double collects, FIG. 6 a section through an embodiment with one collet, and FIG. 7, finally, showing an embodiment having specially arranged grooves for the balls.

The spindle nose shown in FIG. 1 is the type previously most frequently used in turret lathes. The spindle nose proper consists of a sleeve 2 with internal conical seat 1. The conical seat 1 expands towards the turret spindle. A collet 3 can be pressed into the seat 1 by a force directed axially to the seat. The collet 3 is provided with a cone, whose taper is approximately the same as that of the conical seat. The insertion of the collet 3 in seat 1 will result in a force acting on the collet radially towards its centre, whereby an object located in the collet will be clamped. To obtain a force of sufficient strength, the cone angles of collet and seat must be small. As heretofore it has been impossible to use smaller tapering angles than 10–15°, the force has been restricted. Collets having 10° angles have, however, had a tendency to jam in the seat, and this has caused inconveniences. Such large tapering angles also involve the necessity of rather strong axially directed clamping forces. FIG. 1 shows how easily the same device can be made with a smaller tapering angle, simply by providing balls 4 between the surfaces of the seat 1 and the collet 3. However, these balls must lie in a groove 5, which in the drawing is provided in the collet but may as well lie in the surface of the seat.

FIG. 2 shows a spindle nose of later design and used particularly with automatic turret lathes. This spindle nose is formed as a sleeve 6 with a hole 7 for the front end of the collet 8. Here the cone 9 of the collet 8 is tapered acutely inwards towards the spindle. The collet is provided with a shoulder 10 resting against a plane annular surface 11 in the sleeve 6. The collet is compressed by a pressure tube 12, the end portion of which is provided with an internal, outwardly expanding conical seat 13. Also in this embodiment the clamping forces are restricted by the size of the cone angle. If, according to this invention, a row of balls 14 is placed between the seat 13 and the collet 8 also in this spindle nose, exactly the same advantages are won as in the embodiment shown in FIG. 1. Of course a guide groove for the balls must be provided also in this case.

The clamping device according to this invention is not confined to the above, but is usable for a plurality of various purposes. To exemplify this, FIGS. 3 and 4 show how a quick-action lock knob can be adapted according to the invention.

In this case the collet 15 and the sleeve 16 with intermediate balls 17 are enclosed in a common body 18. The body has the form of a tube provided with a bottom 19, between which and the remote side of the collet 15 as viewed from the conical seat there is placed a compression spring 20. A hole 21 in bottom 19 is somewhat larger than the hole of collet 15. Pins 22 throughpassing the sides of body 18 are directed radially towards the body centre and enter into grooves 23 in the sleeve 16. These grooves are extending obliquely relative to the axis of sleeve 16 and are given the form of bayonet grooves. The sleeve 16 and collet 15 are unturnable relative to each other due to a projection 24 provided on collet 15 so as to slide in a groove 24a in the inside of the sleeve 16. In this embodiment a member of some kind should be inserted in the collet 15, for instance a rod.

The clamping device according to FIGS. 3 and 4 is particularly intended to be used as a bracing means for fixtures and the like, such as a fixture with a body provided with a projecting part, around which an object is placed, which should be braced against the body. In such a case, a clamping device according to FIGS. 3 and 4 may be placed on the projecting part outside the object, the whole arrangement then functioning as follows: The body with sleeve, collet and balls is moved towards the object, during which movement there is a certain friction between the projecting part and the collet. As soon as the end of sleeve 16 located outside the body 18 comes into contact with the object, the motion of body 18 will cause a compression of the compression spring against the collet end and an insertion of the latter in the conical seat of sleeve 16. Due to balls 17 the collet 15 will immediately catch around the projecting part. Body 18 is moved nearer to the object, resulting in further compression of spring 20, until the pins 22 can be turned into the oblique portions of grooves 23. It is now possible to turn body 18 relative to sleeve 16 and collet 15. As a result of this turning action, the end of body 18 is pressed against the object, while collet 15 and sleeve 16 are held fast on the projecting part. Turning in the opposite direction will loosen the grip around the projecting part, because the balls 17 are pressed up from the conical seat in sleeve 16 by elasticity of collet 15.

FIGS. 5–7 show, as already mentioned, some embodiments particularly fitted for quick-clamps.

In FIG. 5 the numeral 25 designates a collet and 26 another collet. Each collet has a circular groove 27, and 28 respectively, for the ball rows 29, and 30 respectively. The grooves have semi-circular bottoms, which better support the balls during operation. The first collet 25 has its non-compressible end inserted in a support 31 which is rigidly connected with a second support 32. The second support 32 has a threaded hole 33 in which a screw fitting can be screwed in and out. The screw fitting 34 has also an internal thread, in which a screw sleeve 35 embracing the second collet 26 can be screwed in and out.

The second collet 26 is so arranged in the screw sleeve 35 that it can be turned but not axially displaced in it. To prevent such displacement a shoulder 36 on collet 26 rests via an intermediate bearing ring 37 against one end of the screw sleeve 35, while a securing ring 38 placed in a groove in the non-compressible portion of collet 26 rests against the other end of screw sleeve 35. Rigidly connected to the outer end of screw sleeve 35 is a holder for an operating lever 40, a handwheel or the like for turning the screw sleeve.

The screw fitting 34 is adapted to be locked in a certain position in its support by means of a radially directed set screw 41, which presses against the thread of screw fitting 34 via an intermediate copper lining 42.

The ball rows 29 and 30 of both collets 25 and 26 are enclosed in a sleeve 43, whose inside is provided with two conical seats 44 and 45 expanding toward the sleeve ends, against which seats the ball rows 29 and 30 are resting.

The first collet 25 is placed in the support 21 with its non-compressible portion inserted in a hole in the support. A securing ring 46 is placed in a groove in the collect 25 on one side of the support 31, and a compression spring 48 is provided on the other side of the support between this and a shoulder 47.

In both collets 25 and 26 is placed a round rod 49, which can, by means of operating lever 40, screw sleeve 35, screw fitting 34 and both collets, be clamped relative to the sleeve 43 and be displaced relative to the rigidly interconnected supports 31 and 32 by a further turning of the screw sleeve 35 in the screw fitting 34.

The use of the sleeve 43 with its two conical seats 44 and 45 resting against the ball rows 29 and 30 ensures an automatical equilibration of the pressure on the two collets. The collets may be of different sizes, as shown in the drawing, or of the same size, in the latter case carrying equal parts of the load.

In the embodiment according to FIG. 6, which also shows clamping of a rod 49 which is to be displaced axially relative to a support, only one collet 50 is used for the clamping. This collet 50 has its non-compressible portion fastened in a support 51 and is held in position in one direction by a securing ring 52 and in the other direction by a compression spring 53, which is placed between the support and a flange 54 on the collet. The collet is provided with an annular groove 55 with semicircular bottom, and in the groove lies a row of balls 56. Around the ball row 56 is a sleeve 57 provided with a conical seat 58, against which the balls rest, and a bottom 59.

The sleeve 57 is adapted to be pressed towards the collet by means of a screw sleeve 60, which can be screwed in a screw fitting 61, the latter being screwable in a second support 62 that is rigidly interconnected with the first support 51. The screw sleeve is provided with a holder 63 for an operating lever 64, a handwheel or the like.

When the screw sleeve 60 is screwed into the screw fitting 61 the latter is pressed against the bottom 59 of the sleeve 57 so that the conical seat presses the balls of ball row 56 towards the centre of collet 50, and the latter consequently clamps the rod 49 relative to the sleeve 59. A continued tightening of the screw sleeve 60 will bring about a displacement of the rod relative to the two rigidly interconnected supports 51 and 62.

The embodiment shown in FIG. 7 differs from that according to FIG. 6 in that the spring actuating the collet consists of so-called washer springs 63, and in that each ball of the ball row 64 lies partly in a groove 65 provided in the inner side of sleeve 66 and partly in a groove 67 provided in the outside of the compressible part of the collet. The groove 65 is at right angles to the axis of the device and the groove 66 lies in a plane through this axis.

Of course the groove extending at right angles to the axis of the device may be placed on the outside of the collet, and the groove lying in the plane through this axis may be provided in the sleeve instead. In this embodiment both grooves are thought to have semi-circular bottoms.

A rod arranged to be displaced in any of the ways indicated above can be used for numerous purposes, such as in clamp means, gluing clamps, jacks etc.

What makes this invention so important is in the first place, that the angle of friction is considerably larger in sliding friction than in rolling friction. Sliding friction is produced between a collet and an object inserted in the collet. On the other hand, rolling friction is produced between the collet and the sleeve. It is impossible to disengage a conical collet from a seat having an angle of tapering below 7°, whereas this is done very easily if balls are provided in the interspace between them.

In all embodiments shown, one ball row per collet has been indicated. However, it is possible to use more than one ball row per collet. If two or more ball rows are employed for each collet, the total pressure acting to clamp the object relative to the sleeve is increased.

It will be clearly understood that the invention is not confined to the embodiments described above and illustrated in the accompanying drawings, but may be modified in numerous ways without abandonment of the inventional spirit.

I claim:

1. A clamping device comprising a collet adapted to be pressed into a conical seat in a sleeve by an axially directed force so as to press against a member inserted in said collet and clamp this relative to said sleeve, characterized in that a number of balls (17) is provided between the conical seat and the portion of said collet adapted to be pressed into this seat, said balls being evenly spaced from each other around the portion of said collet adapted to be pressed into said conical seat and being placed in a circular guide groove.

2. A clamping device as claimed in claim 1, characterized in that said collet (15) is adapted to be unturnable relative to said sleeve.

3. A clamping device as claimed in claim 2, characterized in that the outside of said collet (15) is provided with a projection (24) engaging slidably in an axial groove (24a) in the inside of said sleeve (16).

4. A clamping device as claimed in claim 2, characterized in that said sleeve (16) is provided with bayonet grooves (23) extending at acute angles to its axis, each of said bayonet grooves (23) receiving a pin (22) extending inwardly from a body (18) enclosing said sleeve (16), through the turning of which body relative to said sleeve (16) the latter is displaced axially relative to said body (18).

5. A clamping device as claimed in claim 1, and in which said collet is adapted to be unturnable relative to said sleeve, the outside of said collet being provided with a projection engaging slidably in an axial groove in the inside of said sleeve, said sleeve being provided with bayonet grooves extending at acute angles to its axis, each of said bayonet grooves receiving a pin extending inwardly from a body enclosing said sleeve, through the turning of which body relative to said sleeve the latter is displaced axially relative to said body, characterized in that said body has the form of a tube provided with a bottom, a compression spring being placed between said bottom of said body and the end of said collet facing off the conical seat of said sleeve.

6. A clamping device as claimed in claim 5, characterized in that said bottom (19) of said body (18) is provided with a hole which is somewhat larger than the hole of said collet (15), the outside of said body (18) being so shaped, for instance as a star nut, that it can be turned by hand.

7. A clamping device as claimed in claim 1, characterized in that two slotted or multiple part collets are adapted to be pressed in opposite directions into a sleeve provided with two seats expanding conically toward the sleeve ends.

8. A clamping device as claimed in claim 7, characterized in that said sleeve is floating on the balls in such a way that it is guided only through its engagement with said balls and is thus unguided in the axial direction.

9. A clamping device as claimed in claim 7, characterized in that one collet is placed in a rigid support and urged toward one conical seat by a compression spring provided between a flange on said first collet and said support, the sleeve provided with said two conical seats being adapted to be pressed toward said first collet by the insertion of the second collet in the second conical seat of said sleeve, said second collet being displaceable toward said first collet by a screw means.

10. A clamping device as claimed in claim 7, and in which one collet is placed in a rigid support and urged toward one conical seat by a compression spring provided between a flange on said first collet and said support, the sleeve provided with said two conical seats being adapted to be pressed toward said first collet by the insertion of the said second collet in the second conical seat of said sleeve, said second collet being displaceable toward said first collet by a screw means, characterized in that said screw means consists of a screw, which is axially immovable relative to said second collet and is screwable in a second support that is rigidly connected with said first support.

11. A clamping device as claimed in claim 7, and in which one collet is placed in a rigid support and urged toward one conical seat by a compression spring provided between a flange on said first collet and said support, said sleeve provided with two conical seats being adapted to be pressed toward said first collet by the insertion of said second collet in said second conical seat of said sleeve, said second collet being displaceable toward said first collet by a screw means, characterized in that at least one of said collets is adapted to clamp a cylindrical rod placed therein, said cylindrical rod having an attachment for a jaw, which constitutes the displaceable part of a quick-clamp, whose stationary jaw is rigidly connected with said support.

12. A clamping device as claimed in claim 7, and in which one collet is placed in a rigid support and urged toward one conical seat by a compression spring provided between a flange on said first collet and said support, said sleeve provided with two conical seats being adapted to be pressed toward said first collet by the insertion of said second collet in said second conical seat of said sleeve, said second collet being displaceable toward said first collet by a screw means consisting of a screw that is axially immovable relative to said second collet and is screwable in a second support which is rigidly connected with said first support, characterized in that at least one of said collets is adapted to clamp a cylindrical rod placed therein, said cylindrical rod having an attachment for a jaw, which constitutes the displaceable part of a quick-clamp whose stationary jaw is rigidly connected with at least one of said supports.

13. A clamping device as claimed in claim 1, characterized in that said collet is placed in a rigid support and urged toward said conical seat by a compression spring provided between a flange on said collet and said support, the sleeve having said conical seat being adapted to be pressed toward said collet by a screw means.

14. A clamping device as claimed in claim 13, characterized in that said screw means include a screw, which displaces said sleeve axially when screwed in a second support that is rigidly connected with said first support.

15. A clamping device as claimed in claim 13, characterized in that said collet is adapted to clamp a cylindrical rod placed therein, said cylindrical rod having an attachment for a jaw, which constitutes the displaceable part of a quick-clamp whose stationary jaw is rigidly connected with said support.

16. A clamping device as claimed in claim 13, and in which said screw means includes a screw displacing said sleeve axially when screwed in a second support that is rigidly connected with said first support, characterized in that said collet is adapted to clamp a cylindrical rod placed therein, said cylindrical rod having an attachment for a jaw, which constitutes the displaceable part of a quick-clamp whose stationary jaw is rigidly connected with at least one of said supports.

17. A clamping device as claimed in claim 1, characterized in that each ball of one and the same ball row is placed partly in a groove in said conical seat and partly in a groove provided in the outer side of the compressible portion of said collet.

18. A clamping device as claimed in claim 17, characterized in that one of said grooves is at right angles to the axis of the device and the other is placed in a plane through this axis.

19. A clamping device as claimed in claim 17, and in which one of said grooves is at right angles to the axis of the device and the other is placed in a plane through this axis, characterized in that the bottoms of said grooves are semi-circular.

References Cited in the file of this patent

UNITED STATES PATENTS 2,888,284   Holmberg _____ May 26, 1959

FOREIGN PATENTS 41,478   Switzerland _____ 1907
617,867   France _____ Nov. 29, 1926